United States Patent
Herbst et al.

(10) Patent No.: US 8,083,465 B2
(45) Date of Patent: Dec. 27, 2011

(54) REPAIRED TURBINE EXHAUST STRUT HEAT SHIELD VANES AND REPAIR METHODS

(75) Inventors: Eric Herbst, Tolland, CT (US); Jeffrey D. Melman, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 771 days.

(21) Appl. No.: 12/205,257

(22) Filed: Sep. 5, 2008

(65) Prior Publication Data

US 2010/0061846 A1  Mar. 11, 2010

(51) Int. Cl.
*F01D 9/02* (2006.01)
*B23P 6/00* (2006.01)

(52) U.S. Cl. .................. 415/12; 29/402.11; 29/889.1

(58) Field of Classification Search .............. 415/12, 415/209.4, 210.1; 29/402.11, 402.13, 888.011, 29/888.021

See application file for complete search history.

(56) References Cited

U.S. PATENT DOCUMENTS

| | | | |
|---|---|---|---|
| 4,305,697 A | 12/1981 | Cohen et al. | |
| 4,726,104 A | 2/1988 | Foster et al. | |
| 4,993,918 A | 2/1991 | Myers et al. | |
| 6,494,677 B1 | 12/2002 | Grady | |
| 6,673,308 B2 * | 1/2004 | Hino et al. | 420/448 |
| 6,685,431 B2 | 2/2004 | Hiskes | |
| 6,792,758 B2 | 9/2004 | Dowman | |
| 7,043,898 B2 | 5/2006 | Rago | |
| 7,100,358 B2 | 9/2006 | Gekht et al. | |
| 2002/0148115 A1 * | 10/2002 | Burke et al. | 29/889.1 |
| 2006/0137179 A1 * | 6/2006 | Gorman et al. | 29/889.1 |
| 2007/0207038 A1 | 9/2007 | Girgis et al. | |
| 2008/0060344 A1 | 3/2008 | Durocher et al. | |

OTHER PUBLICATIONS

Henderson et al., "Nickel-Based Superalloy Welding Practices for Industrial Gas Turbine Applications", Science and Technology of Welding & Joining, Feb. 2004, pp. 13-21, vol. 9, No. 1.

* cited by examiner

*Primary Examiner* — Stephen W Smoot
(74) *Attorney, Agent, or Firm* — Kinney & Lange, P.A.

(57) ABSTRACT

A method of repairing a turbine exhaust case strut heat shield vane includes removing a damaged portion of the vane, solution heat treating the vane, attaching a replacement section to the vane, and relieving local stresses in an attachment area between the replacement section and the vane.

16 Claims, 4 Drawing Sheets

REPAIRED TURBINE EXHAUST STRUT HEAT SHIELD VANES AND REPAIR METHODS

BACKGROUND

This disclosure relates to gas turbine engines. In particular, this disclosure relates to repaired turbine exhaust strut heat shield vanes and repair methods.

An industrial gas turbine generally includes a stationary exhaust duct through which hot combustion gases are flowed before exiting the main engine into a power turbine used to, for example, generate electricity. The exhaust duct commonly includes an inner annular ring forming the inner wall of the gas path and an outer annular ring forming the outer wall of the gas path. Radially extending struts circumferentially distributed about the engine longitudinal axis span the gas path between and connect to the inner and outer annular rings. Each radially extending strut may be surrounded by an airfoil, thereby forming a stationary vane. The vane acts both to direct gas flow through the exhaust duct and to shield the load bearing struts from heat.

Hot combustion gases discharging from the turbine into the exhaust duct during engine operation commonly have a residual velocity component in the tangential direction with respect to the gas path. The tangential velocity component of the hot combustion gases is undesirable as it detracts from the useful energy that may be extracted from the gas flow. Converting the tangential velocity to axial velocity increases the axial thrust produced by the engine, which in turn increases engine performance. The tangential velocity component of the gas flow may be redirected axially by the vanes surrounding the struts of the exhaust duct. More specifically, each vane airfoil may be contoured to aerodynamically redirect the flow of gases from a tangential direction to an axial direction.

The durability of the turbine exhaust case and its associated load bearing struts depends largely on the material selected for the case. It is generally desirable to select the material of the case struts based on structural versus, for example, thermal properties. Therefore, it is not uncommon to shield the struts by encapsulating them with non-structural vanes that act as heat shields. In this way the exhaust case struts may be formed of a material that exhibits optimal structural properties, but may not be able to withstand the operating temperatures of the engine without the shielding of the vanes. The vanes, on the other hand, may be formed of a material that exhibits optimal thermal, and oxidation and corrosion resistance properties, while not necessarily exhibiting high strengths.

The turbine exhaust case strut heat shield vanes may experience a loss of material due to a combination of abrasion, exfoliation, oxidation, hot corrosion and some mode of metallurgical attack during engine operation. The material on the vanes may have temperature limits hundreds of degrees above the engine operating temperatures. Although the damage observed on the vanes may not have structural repercussions, the damage may compromise, to an increasing degree over time, the heat shielding function of the vanes. As a result, structural exhaust case components, i.e. the struts, which are intended to be protected by the heat shield vanes may also be compromised. For example, there is an increasing risk that the strength properties of the struts will be degraded and that the struts may yield during operation.

SUMMARY

A method of repairing a turbine exhaust case strut heat shield vane includes removing a damaged portion of the vane, solution heat treating the vane, attaching a replacement section to the vane, and relieving local stresses in an attachment area between the replacement section and the vane.

A repaired component of a gas turbine includes a turbine exhaust case strut heat shield vane, a replacement section attached to the vane to repair a damaged portion of the vane, and a stressed relieved attachment area located between the replacement section and the vane.

DETAILED DESCRIPTION

Figure 1:
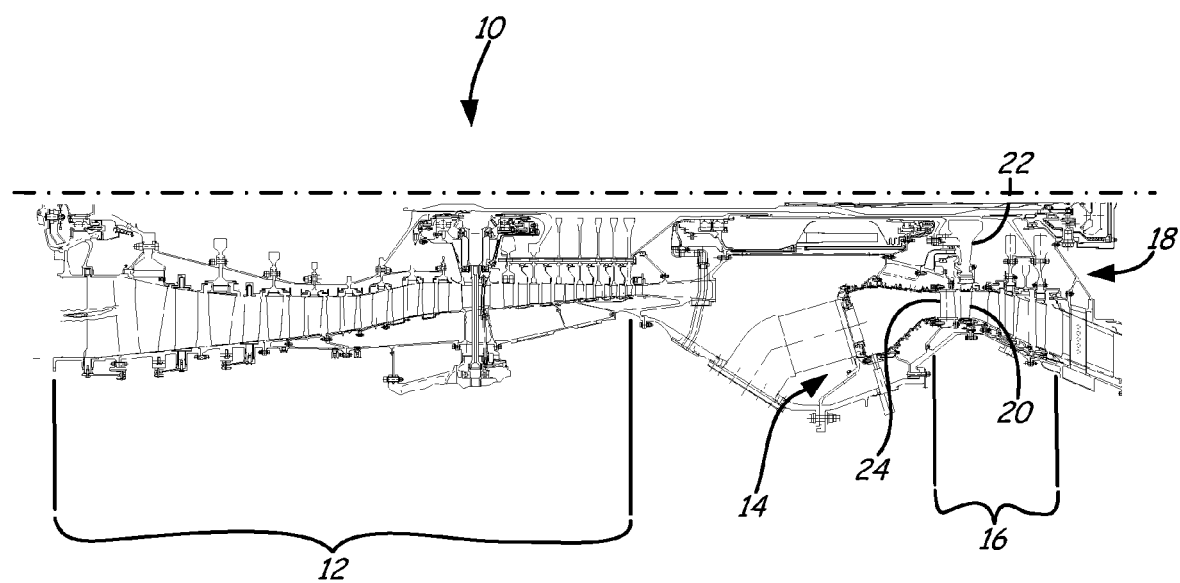
FIG. 1 is an axial section view of an industrial gas turbine including a turbine exhaust case.

FIG. 1 is a partial axial section view of industrial gas turbine 10 including compressor 12, combustor 14, turbine section 16, and exhaust case 18. Although the section view of FIG. 1 shows only one combustor 14, turbine 10 will generally include multiple combustors 14 circumferentially distributed around a turbine main shaft (not shown). Turbine section 16 includes a plurality of rotating blades 20 secured to a rotatable rotor disk 22. A plurality of stationary vanes 24 are each alternately positioned upstream of each of the rotating blades 20. The vanes 24 are dimensioned and configured to guide the working gas over the blades 20.

In operation, air is drawn in through the compressor 12, where it is compressed and driven towards the combustor 14. The compressed air enters combustor 14 through an air intake. After entering combustor 14, the air is mixed with fuel. Combustor 14 ignites the fuel/air mixture, thereby forming a working gas. The working gas exiting combustor 14 may be at a temperature approximately between 2,500° F. and 2,900° F. (1,371° C.-1,593° C.). The gas expands through turbine 16, being guided by vanes 24 to drive rotating blades 20. As the gas passes through turbine 16, it rotates blades 20 which, in turn, drive disk 22, thereby transmitting usable mechanical work through disk 22 to a main shaft of turbine 10. The remaining portion of useful energy in the working gas exits turbine 16 and passes through exhaust case 18. The working gas will commonly proceed downstream from exhaust case 18 into a power turbine (not shown) attached to industrial turbine 10, which may be used to power, for example, an electrical generator. Industrial gas turbine 10 may also include a cooling system configured to supply a coolant, for example, steam or compressed air, to internally cool blades 20 and vanes 24 and other turbine components.

Figure 2:
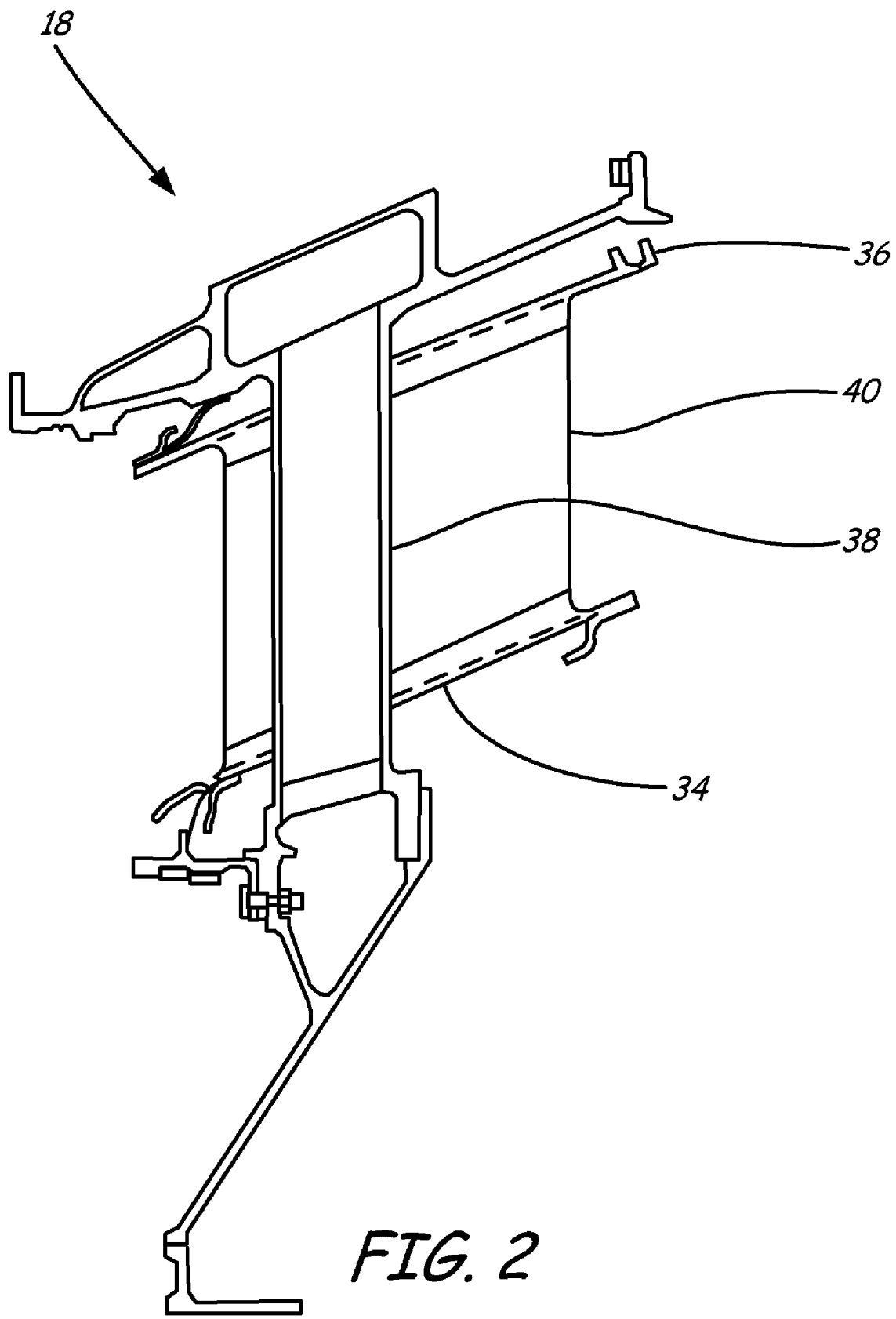
FIG. 2 is a detail view of the turbine exhaust case including a strut heat shield vane from the turbine of FIG. 1.

Exhaust case 18 is positioned downstream of the last row of turbine blades 20 shown in FIG. 1. FIG. 2 is a detail view of exhaust case 18 including a pair of annular rings, such as diffusers 34 and 36, struts 38, and heat shield vanes 40. Diffuser 34 forms the inner wall of the working gas path and diffuser 36 forms the outer wall of the working gas path. Radially extending struts 38 are circumferentially distributed about the engine axis and span the gas path between diffusers 34, 36. Each radially extending strut 38 is surrounded by vane 40. Vanes 40 act both to direct working gas flow through exhaust case 18 and to shield load bearing struts 38 from heat.

Figure 3:
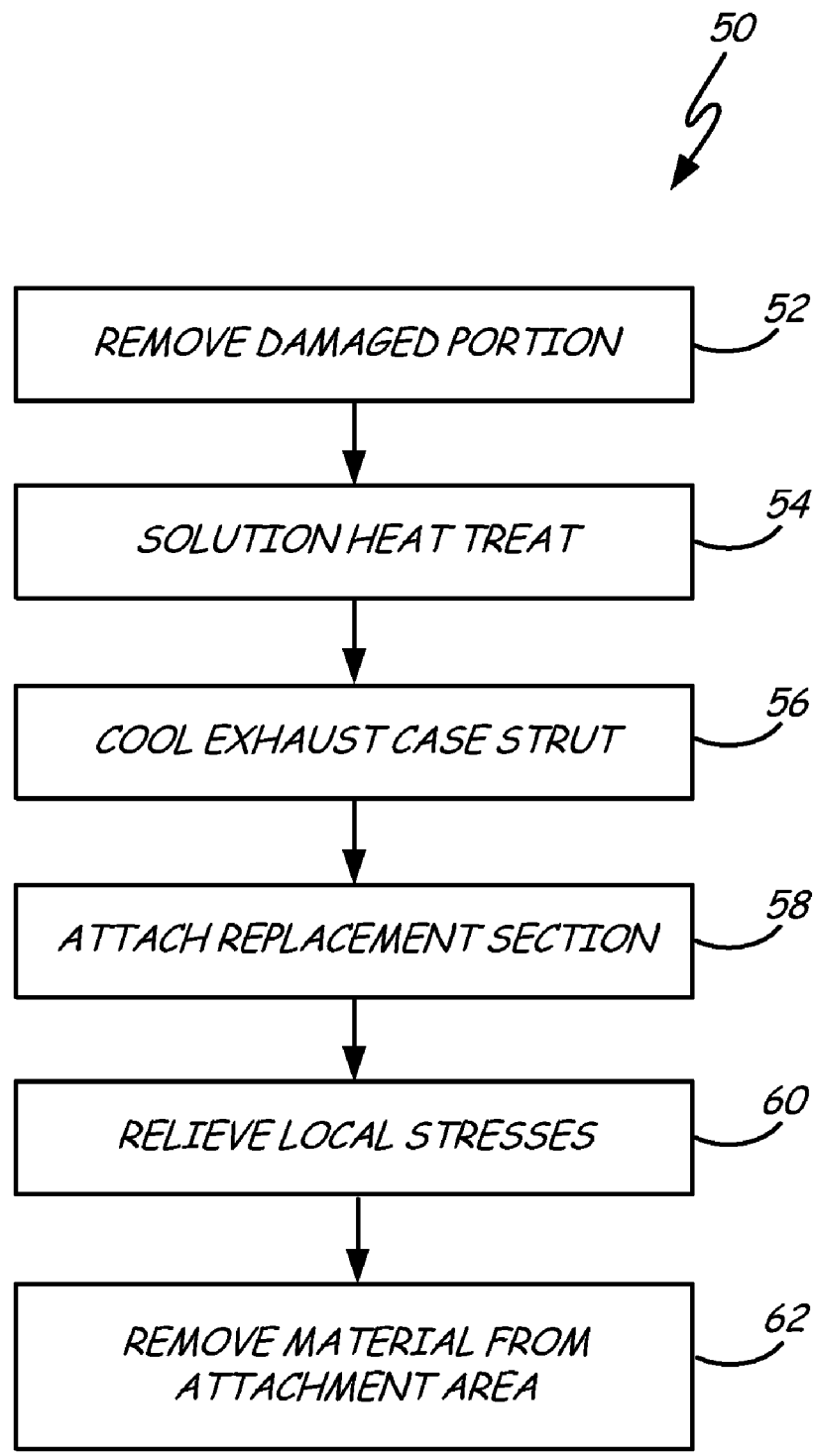
FIG. 3 is a flow chart of an exemplary embodiment of a method for repairing the turbine exhaust strut heat shield vane shown in FIG. 2.

Vanes 40 shown in FIGS. 1 and 2 may experience a loss of material due to a combination of abrasion, exfoliation, oxidation, hot corrosion and some mode of metallurgical attack during engine operation. Although the damage observed on vanes 40 may not have structural repercussions, the damage may compromise, to an increasing degree over time, the heat shielding function of vanes 40. Vanes 40 may therefore be repaired by embodiments of the exemplary method, such as method 50 illustrated by the flow chart of FIG. 3. In FIG. 3, method 50 of repairing a strut heat shield vane includes removing a damaged portion of the vane (step 52), solution heat treating the vane (step 54), cooling an exhaust case strut around which the vane is arranged (step 56), attaching a replacement section to the vane (step 58), relieving local stresses in an attachment area between the replacement section and the vane (step 60), and removing material from the attachment area between the replacement section and the vane (step 62).

Method 50 includes removing a damaged portion of the vane (step 52). The damaged portion of the vane removed (step 52) may be, for example, a damaged portion of the leading edge of the vane. For example, the leading edge may exhibit thinning, cracking, pitting, crevice corrosion, and even holes penetrating the vane wall. During engine operation, the leading edge of the vane generally experiences higher temperatures and greater oxidation, abrasion, and corrosion than other portions of the vane. Therefore, the leading edge of the vane may be worn to a further extent and more rapidly than other portions of the heat shield vane. The damaged portion of the vane may be removed (step 52) with, for example, a manual die grinder or cutting wheel, or by another equivalent method known in the art.

In addition to removing a damaged portion of the vane (step 52), method 50 includes solution heat treating the vane (step 54). Solution heat treatment is a process in which an alloy is heated to a suitable temperature and held at this temperature for a sufficient length of time to allow a desired constituent to enter into solid solution, followed by rapid cooling to hold the constituent in solution. In embodiments of the exemplary method, solution heat treating the vane (step 54) may be employed to, for example, improve the weldability of the vane prior to attaching a replacement section to the vane (step 56), while avoiding any detrimental metallurgical affects to the dissimilar alloy of the structural turbine exhaust case strut (discussed in more detail below).

During engine operation, thermal loading may degrade the heat shield vane material by causing certain constituents, such as carbides and nitrides, to come out of solution and migrate toward grain boundaries. The out of solution constituents may degrade the thermal and structural properties of the heat shield vane material. Solution heat treating the vane (step 54) facilitates bringing the constituents, e.g. carbides and nitrides, of the vane material back into solution in the alloy, which generally rejuvenates the material properties and improves weldability by, for example, improving ductility at the weld site.

Solution heat treating the vane (step 54) may include heat treating the vane in a protective atmosphere of Argon, Hydrogen, Helium, or in a vacuum. The vane may be heated at, for example, 1350° F.+/−25° F. (732° C.+/−13.9° C.) for 4 hours+/−10 minutes and cooled from 1350° F. (732° C.)+/−25° F. to 1200° F. (649° C.)+/−25° F. at a rate of 100 F.° (38° C.)+/−25° F. per 1 hour+/−10 minutes. The vane may then be held at 1200° F. (649° C.)+/−25° F. for 3 hours+/−10 minutes. Any convenient cooling rate may be used below 1200° F.

Prior to attaching a replacement section to the vane (step 58), method 50 may include the optional step of cooling an exhaust case strut around which the vane is arranged (step 56). In some turbine exhaust cases, the exhaust case struts are formed of materials that may need to be kept to temperatures well below the operating temperatures of the engine to maintain their strength. An example material used for turbine exhaust cases, including the struts, is INCONEL® alloy 718 Manufactured by Special Metals Corporation of Huntington, W. Va. INCONEL® alloy 718 is a precipitation-hardenable nickel-chromium alloy also containing significant amounts of iron, niobium, and molybdenum along and lesser amounts of aluminum and titanium. Cooling the exhaust case strut (step 56) may include, for example, directing pressurized air against the strut on the exhaust case.

Method 50 also includes attaching a replacement section to the vane (step 58). Methods of repairing strut heat shield vanes according to the exemplary embodiments facilitate providing repeatable processes for repairing, as opposed to completely replacing, worn heat shield vanes. By being able to repair the heat shield, the exemplary methods facilitate improving the operational performance of the vane by substituting newer, higher performance materials during the repair as compared to known repair methods. For example, the damaged portion of the vane removed (step 52) may be fabricated from a first material and the replacement section attached to the vane (step 58) may be fabricated from a second material. The first and second materials may be identical, i.e., simply replacing the damaged portion with a substantially equivalent replacement section. However, in some embodiments, the first and second materials may be different from one another. For example, in one exemplary embodiment, the first material of the damaged portion may include a nickel-chromium-molybdenum alloy, such as INCONEL® alloy 625 manufactured by Special Metals Corporation of Huntington, W. Va., and the second material of the replacement section may include a nickel-chromium-iron-molybdenum, such as HASTELLOY® X manufactured by Haynes International, Inc. of Kokomo, Ind. HASTELLOY® X alloy possesses a combination of oxidation resistance, fabricability and high-temperature strength. It has also been found to be resistant to stress-corrosion cracking and exhibits good ductility after prolonged exposure at temperatures of, for example, 1200, 1400, and 1600° F. (650, 760, and 870° C. respectively).

Attaching a replacement section to the vane (step 58) may include, for example, butt-welding the replacement section. Butt-welding the replacement section to the strut heat shield vane may include manual gas tungsten arc or manual plasma-transferred arc welding with INCONEL® 625 or HASTELLOY® X weld filler wire. Argon purge back ups may be employed during welding to maximize the weld quality.

In addition to attaching a replacement section to the vane (step 58), method 50 includes relieving local stresses in an attachment area between the replacement section and the vane (step 60). Relieving local stresses in an attachment area between the replacement section and the vane (step 60) may include, for example, heat treating the vane. In embodiments where attaching a replacement section to the vane (step 58) includes welding, the weld site (i.e. attachment area) may include a heat affected zone (HAZ) in the vane alloy surrounding the weld bead. The HAZ commonly includes detrimental effects, such as grain growth, which may make the vane alloy more brittle and cause cracking. Additionally, the rapid cooling of the hot weld material places the material at the weld site in tension, i.e. creates residual stresses in the material from the welding process. In the exemplary embodiments, heat treating the vane after attaching the replacement section (step 58) may act to reduce grain size in the HAZ, as well as relieve residual stresses created during welding. The stress relief heat treatment conducted after attaching the replacement section (step 58) may employ a similar heat treatment schedule as described above with reference to the solution heat treating (step 54).

Method 50 may also include removing material from the attachment area between the replacement section and the vane (step 62). Attaching the replacement section to the vane (step 58) may leave excess material in an attachment area between the replacement section and the vane. For example, in the case the replacement section is welded to the vane, weld beads may protrude between approximately 0.020-0.030 inches (0.508-0.762 mm respectively) above the surrounding surfaces of the vane and therefore may necessitate blending to match the contoured geometry of the vane. Removing material from the welded connection may include one or more of grinding, polishing, and sanding the welded connection. For example, rotary hand tools and aluminum oxide impregnated grinding wheels may be employed to manually blend the weld areas with the adjacent surfaces of the vane.

After removing material from the attachment area (step 62), the repaired strut heat shield vane may be inspected. Inspecting the vane may include, for example, wetting the vane weld areas with high sensitivity fluorescent fluid, and visually inspecting the weld areas under an ultraviolet light source. After inspecting the weld areas, the cross-sectional shape and size of the replacement section may be measured by, for example, using a profile gauge to ensure the replacement section complies with the original specifications of the vane.

Figure 4A:
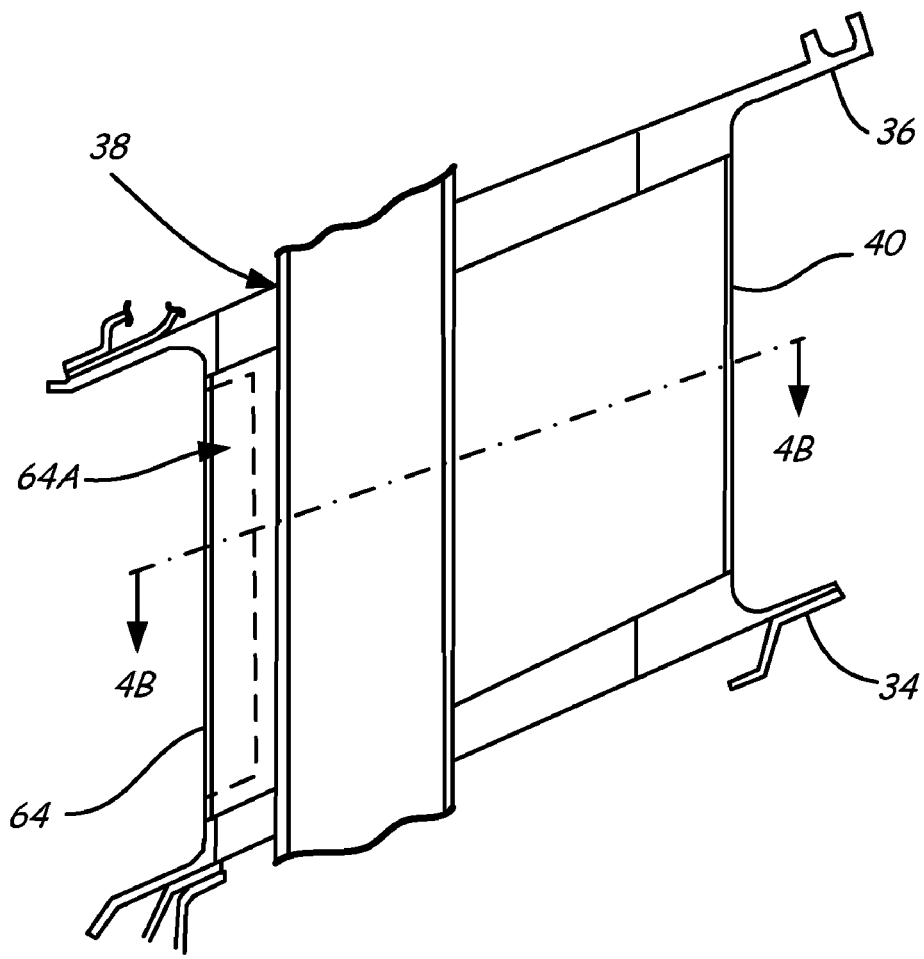
FIGS. 4A and 4B are detail views of a strut heat shield vane repaired by the exemplary method of FIG. 3.
Figure 4B:
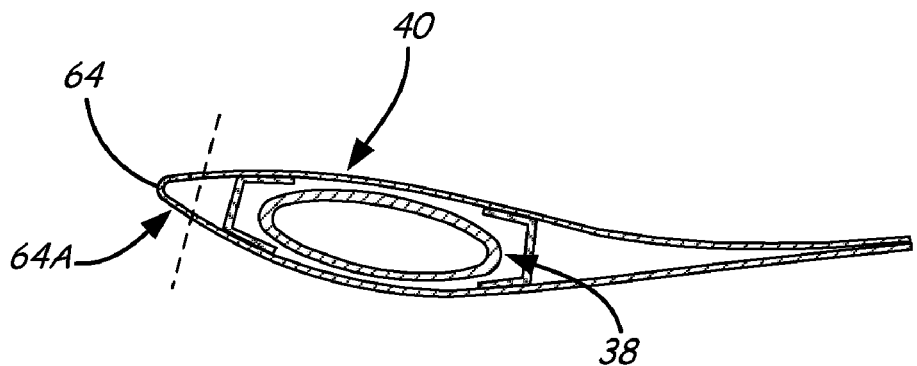

FIGS. 4A and 4B are detail views of strut heat shield vane 40 repaired by method 50 illustrated in FIG. 3. Heat shield vane 40 surrounds strut 38 between diffusers 34 and 36. Vane 40 includes leading edge 64 and replacement section 64a. In the repaired heat shield vane 40 of FIGS. 4A and 4B, leading edge 64 may have experienced a loss of material due to a combination of abrasion, oxidation and some mode of metallurgical attack during engine operation. The damaged portion of vane 40 has therefore been removed in the region of leading edge 64. Replacement section 64a has then been attached to vane 40 by, for example, welding replacement section 64a to vane 40.

The exemplary methods of repairing strut heat shield vanes discussed above facilitate providing repeatable processes for repairing, as opposed to completely replacing, warn or damaged heat shield vanes. As a result of the exemplary embodiments, improving the operational performance of the vane by substituting newer, higher performance materials during the repair may be facilitated. For example, the damaged leading edge of the vane may be fabricated from a nickel alloy, such as INCONEL® 625, while the replacement section attached to the vane in the exemplary methods may be formed of a newer generation, higher performance nickel alloy, such as HASTELLOY® X.

Although the present invention has been described with reference to exemplary embodiments, workers skilled in the art will recognize that changes may be made in form and detail without departing from the spirit and scope of the invention.

The invention claimed is:

1. A method of repairing a turbine exhaust case strut heat shield vane, the method comprising:
   removing a damaged portion of the vane;
   solution heat treating the vane;
   attaching a replacement section to the vane, wherein attaching a replacement section to the vane comprises welding the replacement section;
   cooling one or more portions of a strut around which the vane is arranged to protect the portions of the strut during welding; and
   relieving local stresses in an attachment area between the replacement section and the vane.

2. The method of claim 1, wherein removing a damaged portion of the vane comprises at least one of die grinding and cutting the damaged portion.

3. The method of claim 1, wherein the damaged portion comprises a first material and the replacement section comprises a second material.

4. The method of claim 3, wherein the first material and the second material are substantially the same.

5. The method of claim 3, wherein the first material and the second material are different from one another.

6. The method of claim 5, wherein the first material comprises a nickel-chromium-molybdenum alloy and the second material comprises a nickel-chromium-iron-molybdenum alloy.

7. The method of claim 1, wherein removing a damaged portion of the vane comprises removing a damaged portion of a leading edge of the vane.

8. The method of claim 1, wherein solution heat treating the vane comprises heat treating the vane in a protective atmosphere of at least one of Argon, Hydrogen, and Helium.

9. The method of claim 1, wherein solution heat treating the vane comprises heat treating the vane in a vacuum.

10. The method of claim 1, wherein solution heat treating the vane comprises:
    heating the vane at 1350° F.+/−25° F. (732° C.+/−13.9° C.) for 4 hours+/−10 minutes;
    cooling the vane from 1350° F.+/−25° F. to 1200° F. (649° C.)+/−25° F. at a rate of 100° F. (38° C.)+/−25° F. per 1 hour+/−10 minutes; and
    heating the vane at 1200° F.+/−25° F. for 3 hours+/−10 minutes.

11. The method of claim 1, wherein welding the replacement section to the vane comprises butt-welding the replacement section.

12. The method of claim 1 further comprising removing material from a welded connection between the replacement section and the vane.

13. The method of claim 1, wherein relieving local stresses in an attachment area between the replacement section and the vane comprises heat treating the vane in a protective atmosphere of at least one of Argon, Hydrogen, and Helium.

14. The method of claim 1, wherein relieving local stresses in an attachment area between the replacement section and the vane comprises heat treating the vane in a vacuum.

15. The method of claim 1, wherein relieving local stresses in an attachment area between the replacement section and the vane comprises:
    heating the vane at 1350° F.+/−25° F. (732° C.+/−13.9° C.) for 4 hours+/−10 minutes;
    cooling the vane from 1350° F.+/−25° F. to 1200° F. (649° C.)+/−25° F. at a rate of 100° F. (38° C.)+/−25° F. per 1 hour; and
    heating the vane at 1200° F.+/−25° F. for 3 hours+/−10 minutes.

16. A method of repairing a turbine exhaust case strut heat shield vane, the method comprising:
    removing a damaged portion of the vane;
    solution heat treating the vane;
    attaching a replacement section to the vane;
    cooling one or more portions of a strut around which the vane is arranged; and
    relieving local stresses in an attachment area between the replacement section and the vane.

* * * * *